United States Patent
Li et al.

(10) Patent No.: US 10,817,001 B2
(45) Date of Patent: Oct. 27, 2020

(54) UNMANNED AERIAL VEHICLE AND METHOD FOR DETECTING FLIGHT STATE THEREOF, AND WEARABLE DEVICE

(71) Applicant: Goertek Inc., Weifang, Shandong Province (CN)

(72) Inventors: Wenbin Li, Weifang (CN); Tianrong Dai, Weifang (CN); Xin Zhao, Weifang (CN)

(73) Assignee: GOERTEK INC. (CN)

( * ) Notice: Subject to any disclaimer, the term of this patent is extended or adjusted under 35 U.S.C. 154(b) by 0 days.

(21) Appl. No.: 16/461,624

(22) PCT Filed: Jul. 20, 2017

(86) PCT No.: PCT/CN2017/093723
§ 371 (c)(1),
(2) Date: May 16, 2019

(87) PCT Pub. No.: WO2018/095061
PCT Pub. Date: May 31, 2018

(65) Prior Publication Data
US 2020/0062378 A1 Feb. 27, 2020

(30) Foreign Application Priority Data

Nov. 23, 2016 (CN) .......................... 2016 1 1037607

(51) Int. Cl.
*H04R 27/00* (2006.01)
*G05D 1/10* (2006.01)
(Continued)

(52) U.S. Cl.
CPC ............. *G05D 1/101* (2013.01); *B64C 13/24* (2013.01); *B64C 39/024* (2013.01); *G08C 17/02* (2013.01); *B64C 2201/141* (2013.01)

(58) Field of Classification Search
CPC . B64C 13/24; B64C 39/024; B64C 2201/141; G05D 1/101; G08C 17/02
(Continued)

(56) References Cited

U.S. PATENT DOCUMENTS

| 9,415,870 B1 | 8/2016 | Beckman et al. |
| 2015/0268666 A1 | 9/2015 | Wang et al. |

(Continued)

FOREIGN PATENT DOCUMENTS

| CN | 202735105 U | 2/2013 |
| CN | 103426282 A | 12/2013 |

(Continued)

*Primary Examiner* — Ammar T Hamid
(74) *Attorney, Agent, or Firm* — Clark Hill PLC; James R. Foley

(57) ABSTRACT

An unmanned aerial vehicle, a method for detecting a flight state thereof, and a wearable device (500) are disclosed. The method comprises: disposing a propeller operation state collector (302) for collecting an operation state signal of a propeller (301) on at least one support arm (303) of the UAV (S101); acquiring the operation state signal of the propeller (301) collected by the propeller operation state collector (302) (S102); processing the operation state signal to obtain an operation state of the propeller (301) (S103); and determining the flight state of the UAV according to the operation state of the propeller (301) (S104). By disposing the propeller operation state collector (302) on the support arm (303) of the UAV to collect the operation state signal of the propeller (301), and then calculating the flight state of the UAV according to the operation state signal, better flight control of the UAV can be achieved by making use of the detected flight state of the UAV, and an desired flight trajectory can be obtained, thereby improving the controllability and safety during the flight of the UAV.

13 Claims, 4 Drawing Sheets

(51) Int. Cl.
*B64C 13/24* (2006.01)
*B64C 39/02* (2006.01)
*G08C 17/02* (2006.01)
*H04R 3/00* (2006.01)

(58) Field of Classification Search
USPC .................................................... 381/86, 92
See application file for complete search history.

(56) References Cited

U.S. PATENT DOCUMENTS

2017/0274984 A1* 9/2017 Beckman ................ B64C 11/50
2019/0333494 A1* 10/2019 Park ....................... H04R 1/406

FOREIGN PATENT DOCUMENTS

| CN | 103744021 | A | * | 4/2014 |
|----|-----------|---|---|--------|
| CN | 103744021 | A | | 4/2014 |
| CN | 103822699 | A | | 5/2014 |
| CN | 104834249 | A | | 8/2015 |
| CN | 204789941 | U | | 11/2015 |
| CN | 105116271 | A | | 12/2015 |
| CN | 105527572 | A | | 4/2016 |
| CN | 205209768 | U | | 5/2016 |
| CN | 205334112 | U | * | 6/2016 |
| CN | 205334112 | U | | 6/2016 |
| CN | 106774381 | A | | 5/2017 |
| CN | 206282146 | U | | 6/2017 |

* cited by examiner

UNMANNED AERIAL VEHICLE AND METHOD FOR DETECTING FLIGHT STATE THEREOF, AND WEARABLE DEVICE

TECHNICAL FIELD

The present disclosure relates to the technical field of unmanned aerial vehicle (UAV) and in particular to a UAV, a method for detecting a flight state thereof, and a wearable device.

BACKGROUND

A UAV is an unmanned aerial vehicle controlled mainly by wireless remote control or its own program. In order to obtain a desired flight trajectory or ensure the flight safety, the existing UAV needs to transmit the flight state to a remote controller when it is in flight. In addition, the UAV needs to change the flight state during flight to adapt to the flight condition. However, there is not a simple and effective technical solution for detecting the flight state of the UAV in the prior art, which affects the flight control of the UAV, and the controllability and safety during the flight of the UAV are poor.

SUMMARY

The present disclosure provides a UAV, a method for detecting a flight state thereof, and a wearable device to solve the problem in the prior art that there is not a simple and effective technical solution for detecting the flight state of the UAV, and the controllability and safety during the flight of the UAV are poor.

According to an aspect of the present disclosure, a method for detecting a flight state of a UAV is provided, wherein A propeller operation state collector for collecting an operation state signal of a propeller is disposed on at least one support arm of the UAV, wherein the method comprises:

acquiring the operation state signal of the propeller collected by the propeller operation state collector;

processing the operation state signal to obtain an operation state of the propeller; and determining a flight state of the UAV according to the operation state of the propeller.

According to another aspect of the present disclosure, a UAV is provided, wherein The UAV comprises: a fuselage, a flight control panel disposed on the fuselage, and a support arm disposed on the fuselage, wherein the support arm is provided with a propeller and a motor for driving the propeller connected thereto to rotate, wherein each support arm is provided with a propeller operation state collector connected with the flight control panel for collecting an operation state signal of the propeller; and the flight control panel is provided with a signal acquiring unit for acquiring the operation state signal of the propeller collected by the propeller operation state collector, and a flight state judging unit for processing the operation state signal to obtain a current operation state of the propeller, and determining the flight state of the UAV according to the operation state of the propeller.

According to still another aspect of the present disclosure, a wearable device is provided, wherein The wearable device comprises:

a wireless communication module for receiving an operation state signal of a propeller sent by a UAV; and a flight remote control module for processing the operation state signal to obtain an operation state of the propeller, determining a flight state of the UAV according to the operation state of the propeller, generating a corresponding flight remote control command when the flight state of the UAV is abnormal, transmitting the flight remote control command to the UAV through the wireless communication module, and controlling the UAV to perform a corresponding flight operation.

The advantageous effects of the present disclosure are as follows. The method for detecting a flight state of a UAV according to the present disclosure disposes the propeller operation state collector on at least one support arm of the UAV, acquires the operation state signal of the propeller collected by the propeller operation state collector, processes the operation state signal to obtain the operation state of the propeller, and determines the flight state of the UAV according to the operation state of the propeller. Therefore, the method can detect and judge the flight state of the UAV by using the operation state of the propeller, and provide the possibility that the flight control system of the UAV knows the current flight state of the UAV and performs the corresponding flight control, thereby avoiding wrong flight control of the UAV, and improving the controllability and safety during the flight of the UAV.

DETAILED DESCRIPTION

Figure 1:
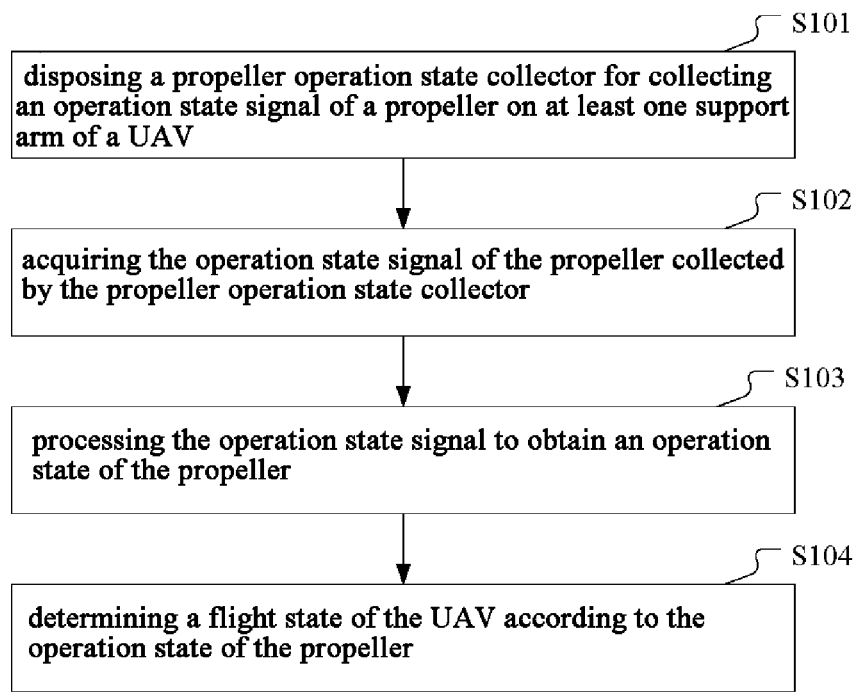
FIG. 1 is a schematic flow chart of a method for detecting a flight state of a UAV according to an embodiment of the present disclosure.

Exemplary embodiments of the present disclosure will be described in more detail below with reference to the accompanying drawings. While the exemplary embodiments of the present disclosure are shown in the drawings, it should be understood that the present disclosure can be implemented in various forms and not limited by the embodiments illustrated herein. Rather, these embodiments are provided so that this disclosure will be more fully understood, and the scope of the disclosure can be fully conveyed to a person skilled in the art.

First Embodiment

FIG. 1 is a schematic flow chart of a method for detecting a flight state of a UAV according to an embodiment of the present disclosure. Referring to FIG. 1, the method for detecting a flight state of a UAV of the present embodiment comprises the following steps:

Step S101, disposing a propeller operation state collector for collecting an operation state signal of a propeller on at least one support arm of the UAV;

Step S102, acquiring the operation state signal of the propeller collected by the propeller operation state collector;

Step S103, processing the operation state signal to obtain an operation state of the propeller; and Step S104, determining the flight state of the UAV according to the operation state of the propeller.

It should be noted that, The above specific steps may be implemented by corresponding functional units in the UAV As can be seen from FIG. 1, the method for detecting a flight state of a UAV of the present embodiment obtains the operation state of the propeller by acquiring the operation state signal of the propeller, thereby obtains the most direct and useful information required by flight control, that is, the operation state information of the propeller, and then determines the flight state of the UAV according to the operation state information of the propeller, which facilitates corresponding flight control of the UAV according to the flight state of the UAV, thereby improving the controllability and safety during the flight of the UAV and enhancing the competitiveness of product.

Second Embodiment

In the present embodiment, the propeller operation state collector is specifically a sound sensor capable of detecting the sound intensity of the ambient environment. The sound sensor is for collecting the sound signal emitted when the propeller is operating. The method for detecting a flight state of a UAV of the present embodiment comprises the following steps:

acquiring the sound signal collected by the sound sensor; and processing the sound signal collected by the sound sensor to obtain the operation state of the propeller.

The operation state of the propeller herein mainly includes the rotational speed of each propeller and whether it is in an abnormal state.

By disposing a sound sensor on at least one support arm of the UAV to collect the sound emitted when the propeller is operating, and calculating the collected sound to determine the operation state of the propeller, information such as the rotational speed and changes in amplitude can be obtained after the sound signal of the sound sensor is processed, which can reflect the state of the propeller. It can be judged whether the propeller is abnormal or not (for example, whether the paddle is broken or not) by the operation state information, and whether the rotational speed of the propeller is inconsistent with the flight control expectation. Then, these important information is fed back to the flight control system of the UAV, which facilitates the control and adjustment of the UAV by the flight control system, and improves the controllability and safety during the flight of the UAV.

It should be noted that, in other embodiments of the present disclosure, the propeller operation state collector may also be an acceleration sensor, which is tightly attached to the support arm of the UAV, and the method for detecting a flight state of a UAV comprises the following steps: acquiring the vibration signal transmitted to the support arm (solid medium) when the propeller is operating to obtain the operation state signal of the propeller, then calculating the operation state of the propeller according to the operation state signal and the corresponding algorithm, and determining the flight state of the UAV according to the operation state of the propeller. For more technical details of calculating the operation state of the propeller according to the propeller operation state signal collected by an acceleration sensor, reference may be made to the recitation in the prior art, and the description thereof will not be repeated here.

Third Embodiment

In the present embodiment, the propeller operation state collector is specifically a microphone. Thus, the method for detecting a flight state of a UAV of the present embodiment comprises: disposing a microphone (hereinafter referred to as MIC) on at least one support arm of the UAV; acquiring a sound signal collected by the microphone, and processing the sound signal to obtain the operation state of the propeller; and determining the flight state of the UAV according to the operation state of the propeller.

The Implementing steps of the method for detecting a flight state of a UAV according to the present disclosure will be described below by taking a quadrotor UAV as an example.

In order to collect the sound signal emitted from the propeller by the microphone and determine the operation state of each propeller according to the sound signal, in the present embodiment, a plurality of MICs (the number of the microphones and the number of the propellers are equal) are used to collect a plurality of sound signals emitted from the propellers, and the distribution of the MICs on the UAV is optimized.

First, the disposing of the MICs is explained.

In the present embodiment, a MIC is disposed in the vicinity of each propeller for collecting the sound emitted when the propeller is operating, and the distance from the MIC to the propeller is determined so that the sound emitted from the closest propeller is dominant in the sounds collected by the MIC.

Since each MIC collects the sounds emitted from all the propellers when the propellers are operating at the same time, the information collected by the plurality of MICs contains the sounds emitted from all the propellers when they are operating, but in the sounds collected by a MIC, the sound emitted from the closest propeller will be the largest and the sounds emitted from the other propellers which are further away will typically be less than a predetermined threshold (for example, 15 dB) or even less. Therefore, even in the case of multi-source combined sound collection, the sound from a propeller collected by the closest MIC is still dominant and larger than those collected by other MICs by at least a predetermined sound pressure level threshold (for example, 3 dB). Therefore, in the present embodiment, the processing result of the sound signal of the MIC which is closest to each propeller may be used to represent the operation state of the propeller.

Further, in the present embodiment, the microphones are disposed opposite to openings of surfaces of the support arms, and axis directions of sound receiving holes of the microphones are different from axis directions of the propellers on the support arms. Preferably, the MIC opening directions (i.e., the axis directions of the sound receiving holes) may be different from the distribution directions of the propellers on the support arms. For example, the MIC opening directions face away from the propellers, and when the propellers are at the upper parts of the support arms, the MIC openings are at the lower parts of the support arms, to prevent the MICs from being directly affected by the strong wind when the propellers are operating and thus resulting in wind noise distortion and affecting the judgment result.

Specifically, the angles between the axis directions of the MIC openings and the axis directions of the propellers are in the range of [90°, 180°]. That is, the angles may be any value from 90 degrees to 180 degrees inclusively. In addition, the axis direction of each MIC may be different. For example, axis directions of sound receiving holes of two microphones located on diagonal lines are the same, and axis directions of sound receiving holes of two neighboring microphones are different.

Furthermore, since the omnidirectional microphone is insensitive to the sound source position, the omnidirectional microphone is used in the present embodiment to collect as much as possible the sound emitted from the closest propeller when it is operating.

Finally, in the present embodiment, in order to ensure the consistency of the subsequent sound signal processing, the frequency response characteristics of the MIC are measured and calibrated. Specifically, the frequency response is compensated to a straight line within the rotational speed bandwidth of the motor that drives the propeller, which is generally in the range of 50 Hz to 300 Hz and is determined according to the motor parameters. That is, for inputs of equal loudnesses, the output levels remain the same. Moreover, in order to avoid the difference between the MICs affecting the accuracy of the detection result in later calculations, preferably, the MICs used in the present embodiment are of the same product model.

Second, after the disposing of the microphone is completed, the microphone is used to collect the sound signal emitted when the propeller is operating.

The method for detecting a flight state of a UAV of the present embodiment firstly comprises a step of acquiring a sound signal collected by the microphone. Specifically, the step of acquiring a sound signal collected by the microphone comprises: receiving a sound signal collected by the microphone by using an analog-to-digital converter comprising a plurality of collecting interfaces connected to the microphone individually, and performing sampling, filtering, and analog-to-digital conversion on the received sound signal.

After acquiring the sound signal collected by the microphone, pre-processing is performed.

As described above, in the present embodiment, in order to detect the states of the four propellers of the UAV, a microphone is disposed near each propeller. As a plurality of MICs are used, it is necessary to ensure the consistency of the recorded data of each analog-to-digital converter. The delay should be substantially the same so that synchronization signals are processed when different MIC signals need to be used simultaneously.

In order to obtain data of higher accuracy, a higher sampling frequency (e.g., 192 kHz) and a larger number of sampling bits (e.g., 32 bits) are used in the present embodiment. In addition, for a specific multi-rotor UAV, the range of the rotational speed of the motors driving the propellers is constant, so in actual uses, the rotational speed information of the propellers can be used in band-pass filtering to filter out useless information. For example, if the motor starts at 50 Hz and the maximum rotational speed is 250 Hz, a band-pass filter with a frequency range of 20 Hz to 300 Hz may be used to filter the sound signal collected by the microphone.

The filtered data are subjected to analog-to-digital conversion, and the data after the analog-to-digital conversion and a specific algorithm are used to judge the state of the propeller. It should be noted that, the sampling, filtering and analog-to-digital conversion herein are conventional pre-processing of the sound signal collected by the microphone, are not the focus of the present embodiment, and can be implemented by using the prior art.

After the sound data are pre-processed, further calculation processing is required to obtain the operation state of the propeller.

It will be described particularly below how to process the sound signal to obtain the operation state of the propeller.

In the present embodiment, there are a plurality of MICs. Since each MIC sound data of the multi-MIC sound data comprise the sound data of a plurality of propellers when they are operating, the using the sound signal collected by the microphone to determine the operation state of the propeller in the present embodiment is a multi-MIC multi-source data processing procedure. In addition, because each MIC collects the sounds emitted from all the propellers when they are operating at the same time, the information collected by the plurality of MICs contains the sounds emitted from all the propellers when they are operating, but in the sounds collected by a MIC, the sound emitted from the closest propeller will be the largest and the sounds emitted from the other propellers which are further away will typically be less than 15 dB or even less. In the case of multi-source combined recording, the sound from a propeller collected by the closest MIC is still dominant and larger than those collected by other MICs by at least 3 dB.

For example, for a quadrotor UAV, the linear distance from a certain MIC A to the closest propeller (such as propeller a) is 5 cm, the linear distance from the MIC A to the two neighboring propellers (such as propellers b and d) is 20 cm, and the linear distance from the MIC A to the farthest propeller (such as propeller c) is 30 cm. Assuming that the sound pressure levels of the sounds from the four propellers are the same, the sound from the propeller a received by the MIC A is 100 dB, the sounds of the propeller b and the propeller d received are both 88 dB, and the sound from the propeller c received is 84.5 dB. The sum of the sounds of the propellers b, c and d is 88 dB+88 dB+84.5 dB=96.5 dB, which is less than the sound from the propeller a by more than 3 dB.

Herein, the calculation method of sound pressure level superposition in the prior art is explained. The superposition of sounds with the same sound pressure level is not simply adding the sound pressure levels arithmetically, and only the energies of the sounds can be superimposed. The superposition of sound pressure levels is performed by the adding of the energies.

Specifically, the calculation formula of the total sound pressure level is: $Lp=20 \lg(p/p0)$, wherein Lp is the sound pressure level (unit: dB), p is the sound pressure (unit: Pa), and P0 is the reference sound pressure, wherein $p0=2\times 10^{-5}$ in air, that is, 20 micropascals.

The calculation formula of the total sound pressure level after the superposition of the sound pressure levels of the three sound sources can be simplified as: $L=20 \log(10^{88/20}+10^{88/20}+10^{84.5/20})$, and the sum of the sound pressure levels of the propellers b, c and d obtained by using the above formula is 96.5 dB.

It can be seen that when a propeller is in a normal state, the sound from the propeller is dominant in the signal of the closest MIC (as in the foregoing example, it is larger than the sounds from the other propellers by more than 3 dB). When a propeller is abnormal, the sound from the propeller becomes smaller, but even if it is not larger than the sound signals from the other propellers, a sudden change of at least 3 dB occurs, so that sudden change may be used to judge the state of the propeller. Similarly, when the propeller is abnormal, the frequency domain will also exhibit changes.

Based on that, in the present embodiment, the steps of acquiring a sound signal collected by the microphone, and processing the sound signal collected by the microphone to obtain the operation state of the propeller comprise:

acquiring a sound signal collected by the microphone, taking the sound signal collected by the microphone as a sound signal from a propeller that is closest to the microphone, and processing the sound signal collected by the microphone to obtain the operation state of the propeller that is closest to the microphone.

That is to say, in the present embodiment, the processing result of the data of the MIC closest to the propeller is used to represent the state of the propeller, and the sound emitted when the propeller is operating is approximated by the sound received by the MIC. Similarly, the rotational frequency of the propeller can also be approximated by the frequency of the sound received by the MIC.

Thus, in actual uses, when the sound signals of a plurality of MICs are received, since there is a dominant signal (i.e., the sound from the propeller closest to the MIC) in the sound signal of each MIC, other signals can be ignored, because other signals may have a certain impact on quantitative analysis but have little impact on qualitative analysis.

For the sake of brief description, in the present embodiment, the sound signal processing of one microphone (such as the MIC A) is described. It can be understood that the sound signal processing of the remaining microphones is the same as and may refer to that of the MIC A.

Figure 2:
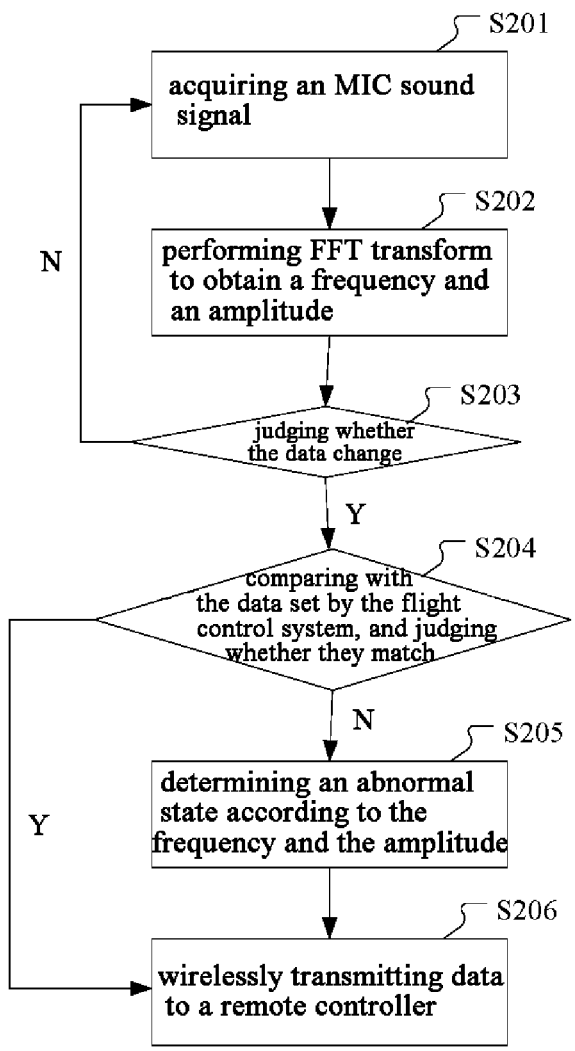
FIG. 2 is a schematic flow chart of a method for detecting a flight state of a UAV according to another embodiment of the present disclosure.

FIG. 2 is a schematic flow chart of a method for detecting a flight state of a UAV according to another embodiment of the present disclosure. Referring to FIG. 2, the method for detecting a flight state of a UAV of the present embodiment comprises the following steps:

Step S201, acquiring a MIC sound signal.

Specifically, a pre-processed sound signal of the MIC A can be obtained in this step.

Step S202, performing FFT transform to obtain a frequency and an amplitude.

After the sound signal of the MIC A is obtained, the sound signal is processed by using a Fast Fourier Transformation (FFT) algorithm. FFT is a fast algorithm of discrete Fourier transform, and transforms a signal into the frequency domain. The features of some signals are difficult to see in the time domain, but if transformed into the frequency domain, it will be easier. That is why the FFT transform is used in the signal analysis in the present embodiment.

In the present embodiment, by transforming the signal of the MIC A into the frequency domain and finding the maximum amplitude value after the FFT transformation, the frequency value corresponding to the maximum amplitude value, which is the rotational frequency of the propeller closest to the MIC A, is obtained. After the rotational frequency of the propeller is obtained, the rotational speed of the propeller can be obtained according to the conversion formula of the rotational frequency and the rotational speed.

The conversion formula here is motor rotational speed n=60 f/P, wherein f is the frequency and P is the number of the pole pairs of the rotating magnetic field of the motor.

In addition, in order to further improve the accuracy of the data, the digital sound signal obtained after the analog-to-digital conversion may be filtered. The specific filtering processing algorithm may be arithmetic average filtering, weighted average filtering, sliding average filtering, median filtering, etc. Then, the filtered sound signal is subjected to FFT transform.

Step S203, judging whether the data change, and if yes, executing step S204, otherwise executing step S201.

In the present embodiment, in order to save the system power consumption and simplify the algorithm, after the rotational speed of the propeller is obtained, the rotational speed calculated this time may be compared with the rotational speed calculated the last time, and the subsequent processing (i.e., judging the state of the propeller based on the changed data) will continue if the data change; otherwise the process will return and continue to acquire the MIC sound signal. That is because if the data do not change, that usually means that the state of the propeller is not abnormal. At this point, the flight control can be performed according to the previous data, and the subsequent specific judging of the abnormal state of the propeller is not needed.

Step S204, comparing with the data set by the flight control system, and judging whether they match; and if yes, executing step S206, otherwise, executing step S205.

In step S204, after the rotational speed of the propeller is received, it is compared with the rotational speed data set in the flight control system.

In actual uses, the flight control system of the UAV will set in real time the voltage of the motor that drives the propeller. The motor voltage has a corresponding relation with the rotational speed. The rotational speed data set in real time will be saved in the chip algorithm. Then, when the flight control system of the UAV receives a real-time value of rotational speed calculated during the flight state detection process of the UAV, the real-time value of rotational speed is compared with the set rotational speed threshold range, and the corresponding state can be determined by the comparison. At the same time, since the MIC signal reflects the amplitude value after the FFT in real time, the sudden change of the amplitude value can also be used jointly to judge the state of the propeller.

In the present embodiment, when it is determined in step S204 that the obtained data match the data set by the flight control system, step S206 may be executed; that is, the rotational speed information of the propeller is transmitted to the remote controller on the ground, so that the remote controller performs a corresponding flight control operation according to the state abnormality information. In that case, there is generally no need to change the flight control parameters.

Step S205, determining an abnormal state according to the frequency and the amplitude.

step S205 is the key to the present embodiment. In the present embodiment, the triggering condition of the propeller abnormal state judging is that the received real-time value of rotational speed exceeds the rotational speed threshold range set by the flight control system.

Specifically, in step S204, the rotational speed value of the propeller calculated according to the frequency value of the sound signal of the MIC A is compared with the set rotational speed threshold range, and if the real-time value of rotational speed is within the set rotational speed threshold range, it is determined that a state of the propeller is normal, and if the real-time value of rotational speed exceeds the set rotational speed threshold range, it is determined that a state of the propeller is abnormal.

That is to say, the flight control system of the UAV sets a rotational speed of the propeller, i.e., the set value of rotational speed, which may be a specific value or a range including specific values. After the MIC signal is processed, a real-time value of rotational speed of the propeller is fed back to the flight control system, and the flight control system determines the state by judging the difference between the set value of rotational speed and the real-time value of rotational speed.

After it is determined that a state of the propeller is abnormal, the specific abnormal state is judged in step S205.

In the present embodiment, a frequency value and an amplitude value of the sound signal at a current moment are calculated according to the sound signal, and the operation state of the propeller is obtained according to a comparison result between on one hand the frequency value and the amplitude value and on the other hand a frequency value and an amplitude value corresponding to a previous moment During the normal operation of the UAV, as the propeller rotational speed increases, the frequency of the emitted sound increases synchronously, and the sound pressure level of the sound also increases. However in abnormal situations such as paddle falling off or paddle being broken of the propeller, the rotational speed of the motor will increase instantaneously, and since there is not a propeller or the propeller is in an abnormal state, the sound pressure level of the emitted sound will become lower.

By taking advantage of such characteristics, the present embodiment provides the following methods of determining an abnormal state.

Determining manner 1: after calculating to obtain the amplitude value and the frequency value at the current moment of the sound signal according to the sound signal of the MIC A, calculating the difference value between the frequency value at the current moment and the frequency value at the previous moment of the sound signal collected by the microphone, if the difference value is greater than a first preset threshold and the amplitude value at the current moment is less than the amplitude value at the previous moment, determining that the propeller is in an abnormal state of paddle falling off, and if the difference value is less than or equal to the first preset threshold and the amplitude value at the current moment is less than the amplitude value at the previous moment, determining that the propeller is in an abnormal state of paddle being broken.

For example, if it is obtained by calculating that the frequency value at the current moment of the sound signal is 50 Hz, and the frequency value at the previous moment is 100 Hz, the difference value between the frequency value at the current moment and the frequency value at the previous moment is 50 Hz. If the first preset threshold is 20 Hz, and after the comparison the condition that the amplitude value at the current moment is less than the amplitude value at the previous moment is also satisfied, it can be determined that the propeller is in an abnormal state of paddle falling off.

Determining manner 2: calculating a difference value between the amplitude value at the current moment and the amplitude value at the previous moment of the sound signal of the MIC A, and if the difference value is greater than a second preset threshold and the frequency value at the current moment is less than the frequency value at the previous moment, determining that the propeller is in an abnormal state of being stuck.

In the present embodiment, the MIC A collects sound data in real time, and the state change of the propeller can be judged by comparing the early and late data. For example, the inventors of the present application have found that when detecting the frequency of the MIC signal under a state of no operation, if the frequency has a significant change, which is usually an increase, and the amplitude value becomes lower after the FFT, that means the load of the motor becomes smaller, and that problem is typically caused by paddle falling off or paddle being broken of the propeller.

Further, it can be judged whether the propeller is broken or falls off by the degree of frequency increasing. In general, the rotational speed of the propeller will change by more than 20% in paddle falling off, and the value will be lower in paddle being broken. Moreover, the typical behavior of the abnormal state of being stuck of the propeller is that the frequency suddenly becomes lower. In being stuck of the propeller, the rotational speed of the propeller is 0, but the value of the sound signal collected by the MIC is not 0 since there are interference noise and sound signals emitted from the other propellers. At this point, the frequency of the sound signal collected by the MIC near the stuck propeller will decrease and the amplitude will significantly decrease.

Optionally, after step S205 is executed, step S206 may be executed to wirelessly transmit data to a remote controller, and the remote controller determines the flight state of the UAV according to the operation state of the propeller.

Here, the step of determining the flight state of the UAV according to the operation state of the propeller comprises: determining that the flight state of the UAV is normal when the operation state of the propeller is normal, and determining that the flight state of the UAV is abnormal when the operation state of the propeller is abnormal. In actual uses, corresponding control operations may be set in the flight control system of the UAV corresponding to various abnormal operation states of the propeller, and when the propeller is determined to be in a preset abnormal operation state, a corresponding control operation is performed to ensure the flight safety of the UAV.

In addition, when the UAV flight control system changes the state of the UAV, it may be monitored in real time whether the data such as the rotational speed and amplitude of the propeller of the UAV match the data set by the flight control system, and the monitoring result is feedback to the flight control system to achieve optimization and self-adaptation of algorithms.

In sum, the method for detecting a flight state of a UAV of the present embodiment can obtain the rotational speed of the propeller by disposing a microphone in the vicinity of each propeller, collecting the sound signal emitted when the propeller is operating by the microphone and processing the sound signal collected by the microphone, and can determine whether the current flight state of the UAV is in line with the expectations by comparing the rotational speed value with the rotational speed threshold range that is set in the UAV flight control system. In addition, it can determine the specific abnormal state of the propeller by comparing the frequencies and amplitudes of the propeller in time, thereby facilitating the better control of the flight action of the UAV by the flight control system of the UAV, avoiding the occurrence of accidents during flight, and improving the controllability and safety of the UAV.

Fourth Embodiment

Figure 3:
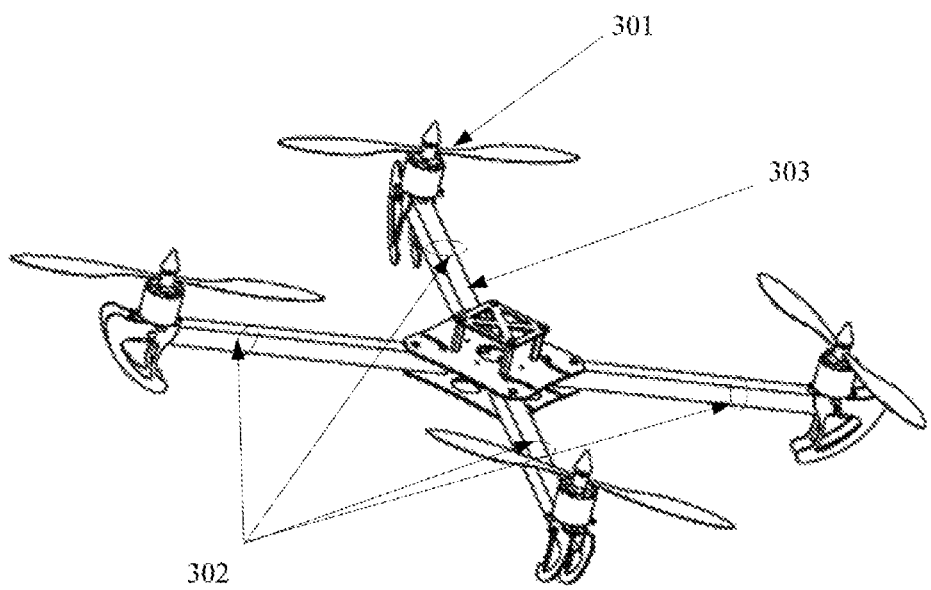
FIG. 3 is a schematic view of the structure of a UAV according to an embodiment of the present disclosure.
Figure 4:
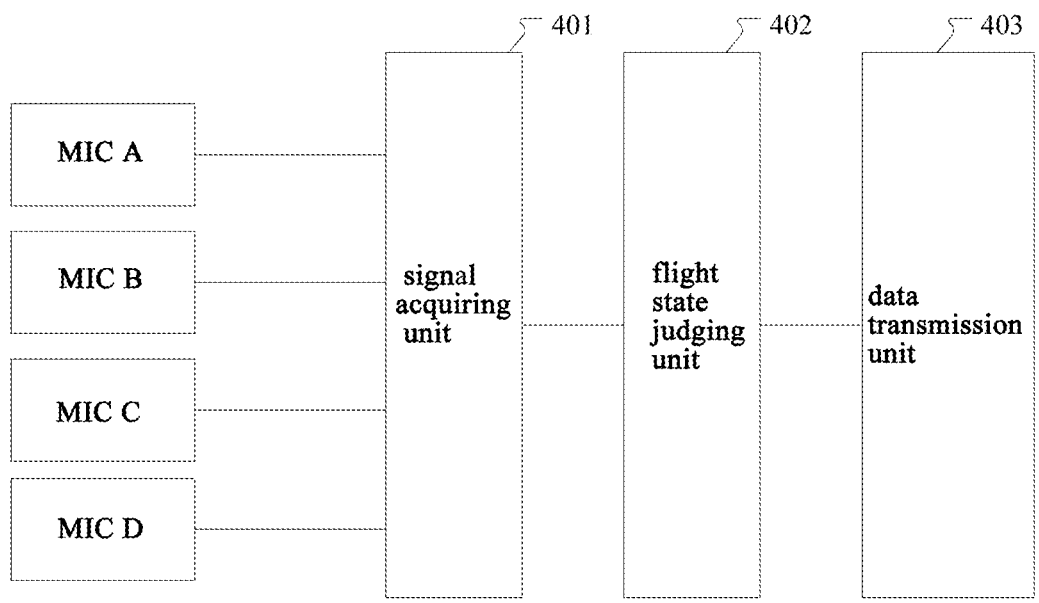
FIG. 4 is a hardware block diagram of a UAV according to an embodiment of the present disclosure.

FIG. 3 is a schematic view of the structure of a UAV according to an embodiment of the present disclosure, and FIG. 4 is a structural block diagram of a UAV according to an embodiment of the present disclosure. The structure of the UAV of the present embodiment is described below by referring to FIG. 3 and FIG. 4.

Referring to FIG. 3, the UAV of the present embodiment is a quadrotor UAV, and comprises: a fuselage, a flight control panel disposed on the fuselage, and a support arm 303 disposed on the fuselage. The support arm 303 is provided with a propeller 301 and a motor for driving the propeller 301 connected thereto to rotate. Each of the support arms 303 is provided with a propeller operation state collector 302. The propeller operation state collector 302 is connected with the flight control panel for collecting an operation state signal of the propeller.

The flight control panel is provided with a signal acquiring unit 401 for acquiring the operation state signal of the propeller collected by the propeller operation state collector 302, and a flight state judging unit 402 for processing the operation state signal to obtain a current operation state of the propeller, and determining the flight state of the UAV according to the operation state of the propeller.

In an embodiment of the present disclosure, the propeller operation state collector 302 is a microphone. Referring to FIG. 4, there are four microphones: MIC A, MIC B, MIC C, and MIC D shown in FIG. 4. The four microphones are disposed on the four support arms 303 of the UAV individually.

The signal acquiring unit 401 is specifically for acquiring a sound signal collected by the microphone.

The flight state judging unit 402 is specifically for processing the acquired sound signal to obtain a frequency value of the sound signal, calculating according to the frequency value to obtain a real-time value of rotational speed of the propeller, and comparing the real-time value of rotational speed with the set rotational speed threshold range, if the real-time value of rotational speed is within the set rotational speed threshold range, determining that a state of the propeller is normal, and if the real-time value of rotational speed exceeds the set rotational speed threshold range, determining that a state of the propeller is abnormal; or processing the acquired sound signal to obtain an amplitude value and a frequency value at a current moment of the sound signal, and then calculating a difference value between the frequency value at the current moment and the frequency value at the previous moment of the sound signal collected by the microphone; if the difference value is greater than a first preset threshold and the amplitude value at the current moment is less than an amplitude value at the previous moment, determining that the propeller is in an abnormal state of paddle falling off; and if the difference value is less than or equal to the first preset threshold and the amplitude value at the current moment is less than the amplitude value at the previous moment, determining that the propeller is in an abnormal state of paddle being broken; or calculating a difference value between an amplitude value at a current moment and an amplitude value at a previous moment of the sound signal collected by the microphone; and if the difference value is greater than a second preset threshold and a frequency value at the current moment is less than a frequency value at the previous moment, determining that the propeller is in an abnormal state of being stuck.

In the present embodiment, the microphones are disposed opposite to openings of surfaces of the support arms 303, and axis directions of sound receiving holes of the microphones are different from axis directions of the propellers on the support arms 303; axis directions of sound receiving holes of two microphones located on diagonal lines are the same, and axis directions of sound receiving holes of two neighboring microphones are different.

It should be noted that, the signal acquiring unit 401 and the flight state judging unit 402 may be integrated in one chip and may be two separate chips, which is not limited.

Referring to FIG. 4, preferably, the flight control panel of the UAV of the present embodiment further comprises a data transmission unit 403. When the data transmission unit 403 determines that a state of the propeller is abnormal, the data transmission unit 403 transmits the state abnormality information to a remote controller on the ground, so that the remote controller performs a corresponding flight control operation according to the state abnormality information.

In actual uses, the signal acquiring unit 401 of the present embodiment may be an analog-to-digital converter comprising a plurality of collecting interfaces individually connected to the microphones for acquiring the sound signal collected by the microphone and performing sampling, filtering, and analog-to-digital conversion on the received sound signal.

It should be noted that, in the present embodiment, the functional units in the UAV are corresponding to the steps in the foregoing method embodiments. Therefore, those not described in the working process of the UAV in the present embodiment may refer to the foregoing embodiments, and are not repeated here.

Fifth Embodiment

Figure 5:
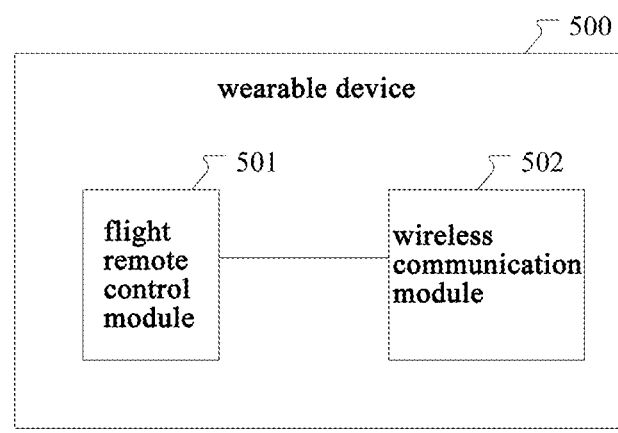
FIG. 5 is a hardware block diagram of a wearable device according to an embodiment of the present disclosure.

FIG. 5 is a block diagram of the structure of a wearable device according to an embodiment of the present disclosure. The wearable device 500 comprises:

a wireless communication module 502 for receiving an operation state signal of a propeller sent by a UAV; and a flight remote control module 501 for processing the operation state signal to obtain an operation state of the propeller, determining a flight state of the UAV according to the operation state of the propeller, generating a corresponding flight remote control command when the flight state of the UAV is abnormal, transmitting the flight remote control command to the UAV through the wireless communication module, and controlling the UAV to perform a corresponding flight operation.

It should be noted that, in actual uses, the judging of the UAV flight state may be performed by the flight state judging unit in the UAV flight control panel, or alternatively, by a flight remote control module in a wearable device on the ground after sending a collected operation state signal of the propeller to the wearable device. Preferably, it is performed by the flight state judging unit in the flight control panel on the UAV to reduce the delay of signal transmission, ensure the instantaneity of the flight control, and improve the efficiency of the flight control.

The wearable device of the present embodiment may be a smart watch or a smart bracelet or the like.

In sum, the method for detecting a flight state of a UAV according to the present disclosure disposes the propeller operation state collector on at least one support arm of the UAV, acquires the operation state signal of the propeller collected by the propeller operation state collector, processes the operation state signal to obtain an operation state of the propeller, and determines the flight state of the UAV according to the operation state of the propeller. Therefore, the method can detect and judge the flight state of the UAV by using the operation state of the propeller, and provide the possibility that the flight control system of the UAV knows the current flight state of the UAV and performs the corresponding flight control, thereby avoiding the occurrence of accidents during the flight, and improving the controllability and safety during the flight of the UAV.

In addition, the present disclosure further provides a UAV. The UAV can detect its flight state by detecting the operation state of the propeller, thereby improving the instantaneity of the flight state, ensuring flight safety and improving the market competitiveness of the products.

Finally, the present disclosure further provides a wearable device that can detect the flight state of the UAV, which meets the user's requirements, and optimizes the user experience.

The above merely describes particular embodiments of the present disclosure. By the teaching of the present disclosure, a person skilled in the art can make other modifications or variations based on the above embodiments. A person skilled in the art should appreciate that, the detailed description above is only for the purpose of better explaining the present disclosure, and the protection scope of the present disclosure should be subject to the protection scope of the claims.

What is claimed is:

1. A method for detecting a flight state of a UAV, wherein a propeller operation state collector for collecting an operation state signal of the propeller is disposed on at least one support arm of the UAV, wherein the method comprises:
   acquiring the operation state signal of the propeller collected by the propeller operation state collector;
   processing the operation state signal to obtain an operation state of the propeller; and
   determining the flight state of the UAV according to the operation state of the propeller;
   wherein the propeller operation state collector is a microphone for collecting a sound signal when the propeller is operating;
   the method comprises:
   acquiring a sound signal collected by the microphone; and
   processing the sound signal collected by the microphone to obtain the operation state of the propeller;
   wherein the step of processing the sound signal collected by the microphone to obtain the operation state of the propeller comprises:
   calculating according to the sound signal to obtain a frequency value and an amplitude value of the sound signal at a current moment, and obtaining the operation state of the propeller according to a comparison result between the frequency value, the amplitude value, and a frequency value, an amplitude value corresponding to a previous moment.

2. The method according to claim 1, wherein the step of processing the sound signal collected by the microphone to obtain the operation state of the propeller further comprises:
   calculating according to the frequency value to obtain a real-time value of rotational speed of the propeller, and comparing the real-time value of rotational speed with a set rotational speed threshold range; and
   if the real-time value of rotational speed is within the set rotational speed threshold range, determining that a state of the propeller is normal, and if the real-time value of rotational speed exceeds the set rotational speed threshold range, determining that a state of the propeller is abnormal.

3. The method according to claim 1, wherein the step of calculating according to the sound signal to obtain a frequency value and an amplitude value of the sound signal at a current moment, and obtaining the operation state of the propeller according to a comparison result between on one hand the frequency value and the amplitude value and on the other hand a frequency value and an amplitude value corresponding to a previous moment comprises:
   calculating a difference value between the frequency value at the current moment and the frequency value at the previous moment of the sound signal collected by the microphone, after calculating according to the sound signal to obtain the amplitude value and the frequency value at the current moment of the sound signal; and
   if the difference value is greater than a first preset threshold and the amplitude value at the current moment is less than the amplitude value at the previous moment, determining that the propeller is in an abnormal state of paddle falling off, and if the difference value is less than or equal to the first preset threshold and the amplitude value at the current moment is less than the amplitude value at the previous moment, determining that the propeller is in an abnormal state of paddle being broken;
   or,
   calculating a difference value between the amplitude value at the current moment and the amplitude value at the previous moment of the sound signal collected by the microphone, and if the difference value is greater than a second preset threshold and the frequency value at the current moment is less than the frequency value at the previous moment, determining that the propeller is in an abnormal state of being stuck.

4. The method according to claim 1, wherein the steps of processing the sound signal collected by the microphone to obtain the operation state of the propeller comprise:
   taking the sound signal collected by the microphone as a sound signal from a propeller that is closest to the microphone, and processing the sound signal collected by the microphone to obtain the operation state of the propeller that is closest to the microphone.

5. The method according to claim 1, wherein the microphone is disposed at a position of the support arm that is able to satisfy the following condition: a sound pressure level of the sound signal of the closest propeller collected by the microphone is greater than a sum of sound pressure levels of collected sound signals of remaining propellers by a predetermined sound pressure level threshold.

6. The method according to claim 1, further comprising:
   when it is determined that a state of the propeller is abnormal, transmitting the state abnormality information to a remote controller on the ground, so that the remote controller performs a corresponding flight control operation according to the state abnormality information.

7. A UAV, comprising: a fuselage, a flight control panel disposed on the fuselage, and a support arm disposed on the fuselage,
   the support arm is provided with a propeller and a motor for driving the propeller connected thereto to rotate, wherein
   each support arm is provided with a propeller operation state collector connected with the flight control panel for collecting an operation state signal of the propeller; and
   the flight control panel is provided with a signal acquiring unit for acquiring the operation state signal of the propeller collected by the propeller operation state collector, and a flight state judging unit for processing the operation state signal to obtain a current operation state of the propeller, and determining the flight state of the UAV according to the operation state of the propeller;
   wherein the propeller operation state collector is a microphone;
   the signal acquiring unit is specifically for acquiring a sound signal collected by the microphone;
   the flight state judging unit is specifically for processing the acquired sound signal, calculating according to the sound signal to obtain a frequency value and an amplitude value of the sound signal at a current moment, and obtaining the operation state of the propeller according to a comparison result between the frequency value, the amplitude value, and a frequency value, an amplitude value corresponding to a previous moment.

8. The UAV according to claim 7, wherein
the flight state judging unit is further specifically for calculating according to the frequency value to obtain a real-time value of rotational speed of the propeller, and comparing the real-time value of rotational speed with the set rotational speed threshold range, if the real-time value of rotational speed is within the set rotational speed threshold range, determining that a state of the propeller is normal, and if the real-time value of rotational speed exceeds the set rotational speed threshold range, determining that a state of the propeller is abnormal.

9. The UAV according to claim 7, wherein four microphones are provided, and the four microphones are individually disposed on four support arms of the UAV;
the microphones are disposed opposite to openings of surfaces of the support arms, and axis directions of sound receiving holes of the microphones are different from axis directions of the propellers on the support arms; and
axis directions of sound receiving holes of two microphones located on diagonal lines are the same, and axis directions of sound receiving holes of two neighboring microphones are different.

10. The UAV according to claim 7, wherein
sound signal to obtain a frequency value and an amplitude value of the sound signal at a current moment,
the flight state judging unit is specifically for after calculating according to the sound signal to obtain a frequency value and an amplitude value of the sound signal at a current moment, calculating a difference value between the frequency value at the current moment and the frequency value at the previous moment of the sound signal collected by the microphone; if the difference value is greater than a first preset threshold and the amplitude value at the current moment is less than an amplitude value at the previous moment, determining that the propeller is in an abnormal state of paddle falling off; and if the difference value is less than or equal to the first preset threshold and the amplitude value at the current moment is less than the amplitude value at the previous moment, determining that the propeller is in an abnormal state of paddle being broken.

11. The UAV according to claim 7, wherein
the flight state judging unit is specifically for after calculating according to the sound signal to obtain a frequency value and an amplitude value of the sound signal at a current moment, calculating a difference value between an amplitude value at a current moment and an amplitude value at a previous moment of the sound signal collected by the microphone; and if the difference value is greater than a second preset threshold and a frequency value at the current moment is less than a frequency value at the previous moment, determining that the propeller is in an abnormal state of being stuck.

12. The UAV according to claim 7, wherein the flight control panel further comprises a data transmission unit for transmitting state abnormality information to a remote controller on the ground when it is determined that a state of the propeller is abnormal, so that the remote controller performs a corresponding flight control operation according to the state abnormality information.

13. A wearable device, comprising:
a wireless communication module for receiving an operation state signal of a propeller sent by a UAV, wherein the operation state signal of a propeller is a sound signal when the propeller is operating; and
a flight remote control module for processing the sound signal, calculating according to the sound signal to obtain a frequency value and an amplitude value of the sound signal at a current moment, and obtaining the operation state of the propeller according to a comparison result between the frequency value, the amplitude value, and a frequency value, an amplitude value corresponding to a previous moment; determining a flight state of the UAV according to the operation state of the propeller, generating a corresponding flight remote control command when the flight state of the UAV is abnormal, transmitting the flight remote control command to the UAV through the wireless communication module, and controlling the UAV to perform a corresponding flight operation.

* * * * *